(12) United States Patent
Ogasawara

(10) Patent No.: US 8,426,549 B2
(45) Date of Patent: Apr. 23, 2013

(54) RESIN COMPOSITION FOR REFLECTOR, AND REFLECTOR

(75) Inventor: Hideto Ogasawara, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 11/918,443

(22) PCT Filed: Apr. 11, 2006

(86) PCT No.: PCT/JP2006/307633
§ 371 (c)(1),
(2), (4) Date: Oct. 15, 2007

(87) PCT Pub. No.: WO2006/112300
PCT Pub. Date: Oct. 26, 2006

(65) Prior Publication Data
US 2009/0088507 A1    Apr. 2, 2009

(30) Foreign Application Priority Data

Apr. 15, 2005   (JP) ................................ 2005-118517

(51) Int. Cl.
| | | |
|---|---|---|
| *C08K 3/22* | (2006.01) | |
| *C08K 3/00* | (2006.01) | |
| *C08G 69/26* | (2006.01) | |
| *C08L 77/00* | (2006.01) | |

(52) U.S. Cl.
USPC ........... 528/310; 528/332; 528/288; 524/413; 524/497; 524/494; 524/606

(58) Field of Classification Search .................. 524/413, 524/497, 494, 606; 528/288, 332, 310
See application file for complete search history.

(56) References Cited

U.S. PATENT DOCUMENTS

| 2004/0002565 A1* | 1/2004 | Sawada et al. ................. 524/394 |
| 2004/0034152 A1* | 2/2004 | Oka et al. ...................... 524/497 |
| 2007/0161741 A1* | 7/2007 | Ogasawara ................... 524/494 |

FOREIGN PATENT DOCUMENTS

| JP | 07-228776 A | 8/1995 |
| JP | 08-081627 A | 3/1996 |
| JP | 2004-075994 A | 3/2004 |
| JP | 2005-194513 A | 7/2005 |
| WO | WO 03/085029 A1 | 10/2003 |
| WO | WO2005/056681 | * 6/2005 |

* cited by examiner

*Primary Examiner* — James J Seidleck
*Assistant Examiner* — Deve E Valdez
(74) *Attorney, Agent, or Firm* — Buchanan Ingersoll & Rooney PC

(57) ABSTRACT

A polyamide resin composition for reflectors, which gives a molding having high mechanical strength and excellent heat resistance and which stably exhibits a high reflectance and can provide a reflector that resists a decrease in reflectance caused by heating, particularly in a LED production process and a reflow soldering process. A reflector obtained by molding the resin composition is also provided. The polyamide resin composition is composed of defined amounts of a polyamide resin (A), an inorganic filler (B) and a white pigment (C) (with the proviso that the total of the components (A), (B) and (C) does not exceed 100% by weight). The components of the polyamide resin (A) are defined and the polyamide resin (A) has a terminal amino group concentration of 70 to 230 mmol/kg.

5 Claims, No Drawings

RESIN COMPOSITION FOR REFLECTOR, AND REFLECTOR

TECHNICAL FIELD

The present invention relates to a polyamide resin composition suitable for reflectors and a reflector obtained by molding the resin composition. More particularly, the present invention relates to a polyamide resin composition for reflectors, which comprises a polyamide resin, an inorganic filler and a white pigment, is excellent in light reflectance, heat resistance and mechanical properties and is favorable for insert molding, and a reflector obtained by molding the resin composition.

BACKGROUND ART

In order to efficiently utilize light, reflectors have been used in various situations, and in recent years, switching to semiconductor light sources, namely, semiconductor laser and light emitting diode (referred to as "LED" hereinafter), has been promoted for the purpose of downsizing devices and light sources. On that account, not only mechanical strength is required of the reflectors but also excellent heat resistance and capability of being precisely molded are required of the reflectors because surface mounting of the reflectors onto printed wiring boards and the like is carried out. Moreover, a stable and high reflectance is required of the reflectors from the viewpoint of a function of light reflection, and it is necessary to inhibit lowering of reflectance caused by heating particularly in fabrication of LED and a reflow soldering process.

In this field, materials capable of withstanding reflow soldering at a temperature of 260° C. using a lead-free solder are necessary, and therefore, limited resins such as LCP (liquid crystal polymer) and polyamide resins are employed. Of the resins, LCP has a problem that a sufficiently high reflectance cannot be obtained as a reflector because it has low whiteness of a resin. On the other hand, aliphatic polyamides (PA6, PA66, PA11, PA12) having excellent strength properties and injection moldability, which have been widely used as the polyamide resins in the past, do not have sufficient heat resistance to resist the temperature of the reflow soldering process and sufficient low-water absorption properties. Moreover, they have another problem of lowering of reflectance because they are discolored when heated.

In patent documents 1 and 2, polyamide resins for light emitting diode reflectors, which use 1,9-diaminononane as a diamine component, are disclosed. These polyamide resins, however, are not satisfactory in the prevention of lowering of reflectance caused by heating in fabrication of LED, a reflow soldering process and the like.

Patent document 1: WO 03/085029
Patent document 2: Japanese Patent Laid-Open Publication No. 228776/1995

DISCLOSURE OF THE INVENTION

Problem to be Solved by the Invention

It is an object of the present invention to provide a polyamide resin composition for reflectors, which gives a molding having high mechanical strength and excellent heat resistance and stably having a high reflectance and can give a reflector rarely suffering lowering of reflectance caused by heating particularly in a LED production process and a reflow soldering process, and a reflector obtained by molding the resin composition.

Means to Solve the Problem

Under such circumstances as described above, the present inventors have earnestly studied, and as a result, they have found that, to their surprise, the above problems can be solved by a polyamide resin composition containing a polyamide resin whose terminal amino group concentration has been adjusted in a specific range. Based on the finding, the present invention has been accomplished.

That is to say, the constitutional requisites of the present invention are as follows.

(1) A polyamide resin composition for reflectors, comprising 30 to 80% by weight of a polyamide resin (A), 10 to 60% by weight of an inorganic filler (B) and 5 to 50% by weight of a white pigment (C), with the proviso that the total of the components (A), (B) and (C) does not exceed 100% by weight, wherein the polyamide resin (A) comprises dicarboxylic acid component units (a-1) comprising 30 to 100% by mol of dicarboxylic acid component units derived from terephthalic acid and 0 to 70% by mol of component units derived from an aromatic dicarboxylic acid other than terephthalic acid and/or 0 to 70% by mol of component units derived from an aliphatic dicarboxylic acid of 4 to 20 carbon atoms, and diamine component units (a-2) comprising component units derived from a straight-chain aliphatic diamine of 4 to 20 carbon atoms and/or component units derived from an aliphatic diamine having a side chain and having 4 to 20 carbon atoms, and the polyamide resin (A) has a terminal amino group concentration of 70 to 230 mmol/kg.

(2) The polyamide resin composition for reflectors of (1), wherein the diamine component unit (a-2) contained in the polyamide resin (A) is 1,6-diaminohexane.

(3) The polyamide resin composition for reflectors of (1), wherein the polyamide resin (A) has an intrinsic viscosity [η] of 0.5 to 0.9 dl/g and a melting point of 270 to 350° C.

(4) The polyamide resin composition for reflectors of (1), wherein the inorganic filler (B) is a glass fiber.

(5) The polyamide resin composition for reflectors of (1), wherein the white pigment (C) is titanium oxide.

(6) A reflector obtained by molding the polyamide resin composition for reflectors of (1).

(7) The reflector of (6), which has a reflectance retention of not less than 55%.

(8) The reflector of (6), which is a reflector for a light emitting diode element.

Effect of the Invention

According to the present invention, a resin composition for reflectors, which gives a molding having high mechanical strength and excellent heat resistance and stably having a high reflectance and can give a reflector rarely suffering lowering of reflectance caused by heating particularly in a LED production process and a reflow soldering process, and a reflector obtained by molding the resin composition can be provided. Therefore, the industrial value of the present invention is extremely high.

Best Mode for Carrying Out the Invention

The present invention is described in detail hereinafter.
Polyamide Resin (A)
The polyamide resin (A) for use in the invention comprises dicarboxylic acid component units (a-1) and diamine component units (a-2).

Dicarboxylic Acid Component Unit (a-1)

The dicarboxylic acid component units (a-1) to constitute the polyamide resin (A) for use in the invention preferably comprise 30 to 100% by mol of terephthalic acid component units and 0 to 70% by mol of component units derived from an aromatic dicarboxylic acid other than terephthalic acid and/or 0 to 70% by mol of component units derived from an aliphatic dicarboxylic acid of 4 to 20 carbon atoms, and the total amount of these dicarboxylic acid component units (a-1) is 100% by mol. Preferred examples of the component units derived from aromatic dicarboxylic acids other than terephthalic acid include isophthalic acid, 2-methylterephthalic acid, naphthalenedicarboxylic acid, and combinations thereof. The aliphatic dicarboxylic acid component units are derived from aliphatic dicarboxylic acids of 4 to 20 carbon atoms, preferably 6 to 12 carbon atoms, though the number of carbon atoms is not specifically restricted. Examples of the aliphatic dicarboxylic acids used for deriving the aliphatic dicarboxylic acid component units include adipic acid, suberic acid, azelaic acid, sebacic acid, decanedicarboxylic acid, undecanedicarboxylic acid and dodecanedicarboxylic acid. Of these, adipic acid is particularly preferable.

In the dicarboxylic acid component units in the invention, the terephthalic acid component units are desirably contained in amounts of 30 to 100% by mol, preferably 40 to 100% by mol, more preferably 40 to 80% by mol, and the component units derived from an aromatic dicarboxylic acid other than terephthalic acid are desirably contained in amounts of 0 to 70% by mol, preferably 0 to 60% by mol, more preferably 20 to 60% by mol, and/or the component units derived from an aliphatic dicarboxylic acid of 4 to 20 carbon atoms, preferably 6 to 12 carbon atoms, are desirably contained in amounts of 0 to 70% by mol, preferably 0 to 60% by mol, more preferably 20 to 60% by mol.

In the present invention, further, polycarboxylic acid component units may be contained as the dicarboxylic acid component units (a-1), in small amounts, e.g., about not more than 10% by mol, together with the above-mentioned constituent units. Examples of such polycarboxylic acid component units include tribasic acids and polybasic acids, such as trimellitic acid and pyromellitic acid.

Diamine component unit (a-2)

The diamine component unit (a-2) to constitute the polyamide resin (A) for use in the invention is preferably an aliphatic diamine having a straight chain and/or a side chain and having 4 to 20 carbon atoms, preferably 6 to 12 carbon atoms, and the total amount of the diamine component units (a-2) is 100% by mol.

Examples of the straight-chain aliphatic diamine component units include 1,4-diaminobutane, 1,6-diaminohexane, 1,7-diaminoheptane, 1,8-diaminooctane, 1,9-diaminononane, 1,10-diaminodecane, 1,11-diaminoundecane and 1,12-diaminododecane. Of these, 1,6-diaminohexane is preferable. Examples of the component units derived from straight-chain aliphatic diamines having a side chain include 2-methyl-1,5-diaminopentane, 2-methyl-1,6-diaminohexane, 2-methyl-1,7-diaminoheptane, 2-methyl-1,8-diaminooctane, 2-methyl-1,9-diaminononane, 2-methyl-1,10-diaminodecane and 2-methyl-1,1'-diaminoundecane. Of these, 2-methyl-1,7-diaminoheptane, 2-methyl-1,8-diaminooctane and 2-methyl-1,9-diaminononane are preferable.

The polyamide resin (A) for use in the invention can be prepared by polycondensing the dicarboxylic acid component unit (a-1) and the diamine component unit (a-2) in a homogeneous solution. More specifically, the polyamide resin (A) can be prepared by heating the dicarboxylic acid component unit and the diamine component unit in the presence of a catalyst to prepare a low condensate and then polycondensing a melt of the low condensate by giving shear stress to the melt, as described in WO 03/085029.

The polyamide resin (A) for use in the invention needs to have a terminal amino group concentration of 70 to 230 mmol/kg, and has a terminal amino group concentration of preferably 80 to 210 mmol/kg, more preferably 80 to 190 mmol/kg. When the terminal amino group concentration is not less than 70 mmol/kg, lowering of reflectance caused by heating in the LED production process and the reflow soldering process is inhibited. When the terminal amino group concentration is not more than 230 mmol/kg, mechanical properties of the polyamide resin are not impaired, so that such a concentration is preferable.

The terminal amino group concentration is determined in the following manner. Into a tall beaker, 0.5 to 0.7 g of a polyamide resin is accurately weighed as a sample, and 30 ml of m-cresol is added. After nitrogen sealing, the beaker is closed, and the contents in the beaker are stirred at 110° C. for 30 minutes to dissolve the polyamide resin. Then, the beaker is cooled to room temperature, and 2 to 3 droplets of a 0.1% thymol blue/m-cresol solution that is an indicator are added. Then, titration is carried out until the color of the resulting solution is changed from yellow to bluish purple by the use of 0.02M p-toluenesulfonic acid/m-cresol. The terminal amino group concentration is calculated from the following mathematical expression (1). In the blank test, the above operations are carried out without adding the sample.

$$\text{Terminal amino group concentration (mmol/kg)} = (A-B) \times F \times M \times 10^3/S \quad (1)$$

A: titer (ml) of p-toluenesulfonic acid solution required for sample

B: titer (ml) of p-toluenesulfonic acid solution required for blank test

F: factor of p-toluenesulfonic acid solution

M: molar concentration (M) of p-toluenesulfonic acid solution

S: sample weight

In order to adjust the terminal amino group concentration of the polyamide resin (A) in the above range, for example, the amount of the dicarboxylic acid component units (a-1) charged and the amount of the diamine component units (a-2) charged need to be controlled so that the total number of moles of the diamine component units (a-2) charged should become larger than the total number of moles of the dicarboxylic acid component units (a-1) charged in the polycondensation. In the present invention, the terminal amino group concentration of the above value can be obtained by that in the polycondensation of the dicarboxylic acid component units (a-1) and the diamine component units (a-2), the amounts of the dicarboxylic acid component units (a-1) charged and the amine component units (a-2) charged are controlled in such a manner that the ratio of "the total number of moles of the diamine component units (a-2) charged/the total number of moles of the dicarboxylic acid component units (a-1) charged" becomes 1.01 to 1.2, preferably 1.02 to 1.15, more preferably 1.02 to 1.1.

The polyamide resin (A) for use in the invention desirably has an intrinsic viscosity [η], as measured in 96.5% sulfuric acid at 25° C., of 0.5 to 0.9 dl/g, preferably 0.6 to 0.9 dl/g, more preferably 0.7 to 0.9 dl/g. When the intrinsic viscosity is in this range, the polyamide resin is excellent in mechanical properties and fluidity in the molding process. When the intrinsic viscosity is not less than 0.5 dl/g, sufficient mechanical strength can be obtained. When the intrinsic viscosity is not more than 0.9 dl/g, excellent fluidity can be obtained in the molding process, so that such an intrinsic viscosity is preferable. In order to adjust the intrinsic viscosity [η] of the polyamide resin (A) in the above range, for example, a molecular weight modifier is added to the reaction system, and the dicarboxylic acid component units (a-1) and the diamine component units (a-2) are allowed to react with each other. As the molecular weight modifier, a monocarboxylic acid or a monoamine is employable. In the present invention, a monocarboxylic acid is preferable as the molecular weight modifier because excess of the diamine component is charged, as previously described.

Examples of the monocarboxylic acids used herein include aliphatic monocarboxylic acids of 2 to 30 carbon atoms, aromatic monocarboxylic acids and alicyclic monocarboxylic acids. The aromatic monocarboxylic acids and the alicyclic monocarboxylic acids may have substituents in the cyclic structure parts. Examples of the aliphatic monocarboxylic acids include acetic acid, propionic acid, butyric acid, valeric acid, caproic acid, caprylic acid, lauric acid, tridecylic acid, myristic acid, palmitic acid, stearic acid, oleic acid and linoleic acid. Examples of the aromatic monocarboxylic acids include benzoic acid, toluic acid, naphthalenecarboxylic acid, methylnaphthalenecarboxylic acid and phenylacetic acid. Examples of the alicyclic monocarboxylic acids include cyclohexanecarboxylic acid.

Such a molecular weight modifier is used in the reaction of the dicarboxylic acid component units (a-1) with the diamine component units (a-2), and is used in an amount of usually 0 to 0.07 mol, preferably 0 to 0.05 mol, based on 1 mol of the total amount of the dicarboxylic acid component units (a-1) in the reaction system. By using the molecular weight modifier in such an amount, at least a part of the molecular weight modifier is incorporated into the polyamide resin, and thereby, the molecular weight of the polyamide resin (A), namely, intrinsic viscosity [η] thereof, is adjusted within the range defined in the present invention.

The molecular weight modifier also plays an important role in the control of the terminal amino group concentration. That is to say, the polyamide resin (A) having the terminal amino group concentration defined in the invention can be obtained by properly adjusting the molar ratio between the diamine component and the dicarboxylic acid component and the amount of the molecular weight modifier in the aforesaid ranges.

The polyamide resin (A) for use in the invention desirably has a melting point (Tm), as measured by a differential scanning calorimeter (DSC), of 270 to 350° C., particularly preferably 290 to 335° C. When the melting point is not lower than 270° C., deformation of the resulting reflector in the reflow soldering process can be inhibited. When the melting point is not higher than 350° C., decomposition of the polyamide resin does not take place in the melt molding process.

The polyamide resin (A) is desirably added so that the amount of the polyamide resin (A) should become 30 to 80% by weight, preferably 40 to 75% by weight, more preferably 45 to 70% by weight, in 100% by weight of the total amount of the polyamide resin (A), the inorganic filler (B) and the white pigment (C).

Inorganic Filler (B)

The inorganic filler (B) for use in the invention has only to be an inorganic filler which can improve strength of the polyamide resin (A) by adding it to the resin. More specifically, various inorganic reinforcements having shapes of fiber, powder, grain, plate, needle, cloth, mat and the like are employable. In more detail, there can be mentioned, as the inorganic fillers, inorganic fibers, such as glass fiber, metal-coated glass fiber, ceramic fiber, carbon fiber, metal carbide fiber, metal curing product fiber, asbestos fiber and boron fiber. As such a fibrous filler, a glass fiber is particularly preferable. By the use of the glass fiber, moldability of the composition is enhanced, and besides, mechanical properties, such as tensile strength, flexural strength and flexural modulus, and heat resistance properties, such as heat distortion temperature, of a molding produced from the resin composition are enhanced. The mean length of such a glass fiber is in the range of usually 0.1 to 20 mm, preferably 0.3 to 6 mm, and the aspect ratio (L (mean length of fibers)/D (mean outer diameter of fibers) is in the range of usually 10 to 2000, preferably 30 to 600. It is preferable to use a glass fiber having a mean length and an aspect ratio in these ranges.

The inorganic filler (B) is desirably added so that the amount of the inorganic filler (B) should become 10 to 60% by weight, preferably 10 to 50% by weight, more preferably 10 to 40% by weight, in 100% by weight of the total amount of the polyamide resin (A), the inorganic filler (B) and the white pigment (C).

White Pigment (C)

The white pigment (C) for use in the invention has only to be white pigment having properties that the white pigment added to the polyamide resin (A) makes the resin white and enables the resulting white resin to reflect light. Examples of such white pigments include titanium oxide, zinc oxide, zinc sulfide, white lead, zinc sulfate, barium sulfate, calcium carbonate and aluminum oxide. These white pigments may be used singly or in combination of two or more kinds. These white pigments can be used after treated with silane coupling agents, titanium coupling agents or the like. For example, the white pigments may have been surface-treated with silane compounds, such as vinyltriethoxysilane, 2-aminopropyltriethoxysilane and 2-glycidoxypropyltriethoxysilane. As the white pigment, titanium oxide is particularly preferable. By the use of the titanium oxide, optical properties, such as reflectance and hiding property, are enhanced. The titanium oxide is preferably rutile-type one. The particle diameter of the titanium oxide is in the range of 0.05 to 2.0 μm, preferably 0.05 to 0.7 μm.

The white pigment (C) is desirably added so that the amount of the white pigment (C) should become 5 to 50% by weight, preferably 5 to 45% by weight, more preferably 5 to 40% by weight, in 100% by weight of the total amount of the polyamide resin (A), the inorganic filler (B) and the white pigment (C).

Other Additives

In the present invention, the following additives can be added according to the use purpose, within limits not detrimental to the object of the invention. That is to say, there can be added antioxidants (phenols, amines, sulfur compounds, phosphorus compounds, etc.), heat stabilizers (lactone compound, vitamin E and derivatives thereof, hydroquinones, copper halide, iodine compound, etc.), light stabilizers (benzotriazoles, triazines, benzophenones, benzoates, hindered amines, oxalinides, etc.), other polymers (olefins, modified polyolefins, olefin copolymers such as ethylene/propylene copolymer and ethylene/1-butene copolymer, olefin copolymers such as propylene/1-butene copolymer, polystyrene, polyamide, polycarbonate, polyacetal, polysulfone, polyphenylene oxide, fluororesin, silicone resin, LCP, etc.), flame retardants (bromine-based, chlorine-based, phosphorus-based, antimony-based, inorganic type, etc.), fluorescent brighteners, plasticizers, thickening agents, antistatic agents, mold release agents, pigments, crystal nucleating agents, and other various additives publicly known.

Polyamide Resin Composition of the Invention

The polyamide resin composition of the invention can be prepared by a process in which the above components are mixed by a publicly known means, such as a Henschel mixer, a v-type blender, a ribbon blender or a tumbling blender, or a process in which after the mixing, the mixture is further melt blended by a single screw extruder, a twin-screw extruder, a kneader, a Banbury mixer or the like and then subjected to granulation or pulverization.

The polyamide resin composition of the invention desirably contains the polyamide resin (A) in an amount of 30 to 80% by weight, preferably 40 to 75% by weight, more preferably 45 to 70% by weight, in 100% by weight of the total amount of the polyamide resin (A), the inorganic filler (B) and the white pigment (C). When the amount of the polyamide resin (A) is not less than 30% by weight and not more than 80% by weight, a polyamide resin composition having such excellent heat resistance that it can withstand the reflow soldering process without impairing moldability can be obtained.

The polyamide resin composition of the invention desirably contains the inorganic filler (B) in an amount of 10 to 60% by weight, preferably 10 to 50% by weight, more preferably 10 to 40% by weight. When the amount of the inorganic filler (B) is not less than 10% by weight, the molding is not deformed in the injection molding process and the reflow soldering process. When the amount of the inorganic filler (B) is not more than 60% by weight, a molded article having excellent molding properties and appearance can be obtained.

The polyamide resin composition of the invention desirably contains the white pigment (C) in an amount of 5 to 50% by weight, preferably 5 to 45% by weight, more preferably 5 to 40% by weight. When the amount of the white pigment (C) is not less than 5% by weight, light reflection properties such as sufficient reflectance can be obtained. When the amount of the white pigment (C) is not more than 50% by weight, moldability is not impaired, so that such an amount is preferable.

The polyamide resin composition for reflectors of the invention, which has the above constitution, is excellent in mechanical properties, reflectance and heat resistance, and therefore, it can be favorably used for reflectors.

Reflector, Reflector for Light Emitting Diode Element

Reflectors include general casings and housings in which at least a face that emits light is open or is not open, and more specifically, they also include reflectors of three-dimensional shapes having a plate (face such as flat face, spherical face or curved face) as a light-reflecting face, such as a reflector having a shape of box or case, a reflector having a shape of funnel, a reflector having a shape of bowl, a reflector having a shape of parabola, a reflector having a shape of column, a reflector having a conical shape and a reflector having a honeycomb shape.

A reflector for light emitting diode (LED) element is obtained by thermally molding a resin composition usually comprising either a polyamide resin or a polyamide resin and an inorganic filler by injection molding, metal insert molding (particularly hoop molding), melt molding, extrusion molding, inflation molding, blow molding or the like to shape the composition into a desired shape. In the use of the reflector, a LED element and other parts are incorporated into the reflector, and they are sealed, joined or bonded with a sealing resin.

The reflector of the invention is a reflector obtained by molding the aforesaid polyamide resin composition for reflectors. In particular, a reflector having a reflectance retention of not less than 55%, preferably not less than 60%, is preferable. When the reflectance retention is not less than 55%, an optical element having excellent durability can be obtained. By molding the aforesaid polyamide resin composition for reflectors, the reflectance retention can be usually brought to not less than 55%. The reflectance retention can be adjusted by controlling the terminal amino group concentration in the case where the polyamide resin compositions containing the same amounts of the inorganic filler and the white pigment are compared, though the reflectance retention varies depending upon the amounts of the inorganic filler and the white pigment. When increase of the reflectance retention is intended, the terminal amino group concentration has only to be in the range of 70 to 230 mmol/kg. The method to evaluate the reflectance retention is described later.

The polyamide resin composition and the reflector of the invention can be applied not only to LED but also to uses in which light is reflected. More specifically, they can be used as reflectors for light emitting devices, such as various electrical and electronic parts, indoor illuminator, ceiling illuminator, outdoor illuminator, automobile illuminator, display equipment and headlight.

EXAMPLES

The present invention is further described with reference to the following examples, but it should be construed that the invention is in no way limited to those examples. In the examples and the comparative examples, measurements of property values and evaluation thereof were carried out in the following manner.

Terminal Amino Group Concentration

Into a tall beaker, 0.5 to 0.7 g of a polyamide resin was accurately weighed as a sample, and 30 ml of m-cresol was added. After nitrogen sealing, the beaker was closed, and the contents in the beaker were stirred at 110° C. for 30 minutes to dissolve the polyamide resin. Then, the beaker was cooled to room temperature, and 2 to 3 droplets of a 0.1% thymol blue/m-cresol solution that was an indicator were added. Then, titration was carried out until the color of the resulting solution was changed from yellow to bluish purple by the use of 0.02M p-toluenesulfonic acid/m-cresol. In the blank test, the above operations were carried out without adding the sample. The terminal amino group concentration was calculated from the following mathematical expression (1).

$$\text{Terminal amino group concentration (mmol/kg)} = (A-B) \times F \times M \times 10^3 / S \quad (1)$$

A: titer (ml) of p-toluenesulfonic acid solution required for sample

B: titer (ml) of p-toluenesulfonic acid solution required for blank test

F: factor of p-toluenesulfonic acid solution

M: molar concentration (M) of p-toluenesulfonic acid solution

S: sample weight

Intrinsic viscosity [η]

In 50 ml of a 96.5% sulfuric acid solution, 0.5 g of a polyamide resin was dissolved to give a sample solution. Using an Ubbelohde viscometer, falling time (sec) of the sample solution was measured under the conditions of 25° C.±0.05° C., and the intrinsic viscosity was calculated from the following mathematical expression (2).

$$[\eta] = \eta SP / [C(1 + 0.205 \eta SP)] \quad (2)$$

[η]: intrinsic viscosity (dl/g)
ηSP: specific viscosity
C: sample concentration (g/dl)
t: falling time (sec) of sample solution
t0: falling time (sec) of blank sulfuric acid $$\eta SP = (t - t0)/t0$$

Melting Point (Tm)

Using Perkin Elmer DSC7, a sample was temporarily kept at 330° C. for 5 minutes, then cooled down to 23° C. at a rate of 10° C./min and then heated at a rate of 10° C./min. The endothermic peak based on the melting in this case was taken as a melting point.

Reflectance

A test specimen having a thickness of 2 mm, which had been prepared by injection molding, was measured on reflectance at wavelengths of 470 nm, 520 nm and 650 nm.

A reflectance of not less than 85% was evaluated as AA, and a reflectance of less than 85% was evaluated as BB.

Molding machine: IS-55EPN (cylinder temperature: 335° C., mold temperature: 120° C.) manufactured by Toshiba Machine Co., Ltd.

Reflectance measuring device: CM3500d manufactured by Minolta Corp.

Reflectance Retention

A test specimen having a thickness of 2 mm was prepared by an injection molding machine, and the test specimen was heated by a hot air dryer at 180° C. for 14 hours. Before and after the heating, light reflectance of the test specimen at a wavelength of 470 nm was measured, and the ratio of the reflectance after heating to the reflectance before heating was calculated from the following mathematical formula (3).

Reflectance retention(%)=$R2/R1 \times 100$

R1: light reflectance at wavelength of 470 nm before heating

R2: light reflectance at wavelength of 470 nm after heating

Molding machine: IS-55EPN (cylinder temperature: 335° C., mold temperature: 120° C.) manufactured by Toshiba Machine Co., Ltd.

Hot air dryer: DN6101 manufactured by Yamato Scientific Co., Ltd.

Reflectance measuring device: CM3500d manufactured by Minolta Corp.

Example 1

In an autoclave, 2260 g (13.6 mol) of terephthalic acid and 1190 g (8.1 mol) of adipic acid as dicarboxylic acid component units (a-1), 2640 g (22.7 mol) of 1,6-diaminohexane as a diamine component unit (a-2), 75 g (0.6 mol) of benzoic acid as a molecular weight modifier, 5 g (0.047 mol) of sodium hypophosphite as a catalyst and 600 ml of ion-exchanged water were placed. After the autoclave was purged with nitrogen, the internal temperature was raised to 250° C. over a period of 4 hours with stirring the contents in the autoclave. The reaction was continued in this state for 1 hour to prepare a polyamide low condensate. Then, the polyamide low condensate was dried and subjected to solid phase polymerization under vacuum at 190° C. for 6 hours. Thereafter, the reaction product was fed to a twin-screw extruder and subjected to melt polymerization at a cylinder preset temperature of 350° C. to prepare a polyamide resin (A). This polyamide resin (A) had a terminal amino group concentration of 90 mmol/kg, an intrinsic viscosity [η] of 0.8 dl/g and a melting point of 320° C.

Then, the polyamide resin (A) obtained above was used in a proportion of 60% by weight, a glass fiber (length: 3 mm, aspect ratio: 300) was used as the inorganic filler (B) in a proportion of 25% by weight, and titanium oxide (particulate, mean particle diameter: 0.21 μm) was used as the white pigment (C) in a proportion of 15% by weight. That is to say, the polyamide resin (A) and the white pigment (C) were mixed by a tumbling blender, and the resulting mixture was fed to a twin-screw vented extruder manufactured by The Japan Steel Works, Ltd., while the inorganic filler (B) was side-fed to the extruder, followed by melt blending at a preset temperature of 320 to 350° C. Thus, a resin composition in the form of pellets was obtained. Then, properties of the resulting resin composition were evaluated. The results are set forth in Table 1.

Examples 2 and 3

Comparative Examples 1 to 4

Resin compositions were prepared in the same manner as in Example 1, except that the polyamide resin (A), which had been obtained by controlling the amounts of the dicarboxylic acid component unit (a-1), the diamine component unit (a-2) and the molecular weight modifier, the inorganic filler (B) and the white pigment (C) were used in proportions shown in Table 1. Then, properties of the resulting resin compositions were evaluated in the same manner as in Example 1. The results are set forth in Table 1.

TABLE 1

|  |  | Unit | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|---|
| Polyamide resin (A) |  | wt % | 60 | 60 | 60 | 60 | 60 | 60 | 60 |
| Dicarboxylic acid | TA*[1] | mol % | 62.5 | 45 | 55 | 62.5 | 62.5 | 62.5 | 45 |
| component unit (a-1) | AA*[1] | mol % | 37.5 | 55 | 45 | 37.5 | 37.5 | 37.5 | 55 |
| Diamine component unit (a-2) | HMDA*[1] | mol % | 100 | 100 | 100 | 100 | 100 | 100 | 100 |
| Terminal amino group concentration |  | mmol/kg | 90 | 180 | 130 | 65 | 59 | 43 | 55 |
| Intrinsic viscosity [η] |  | dl/g | 0.8 | 0.8 | 0.8 | 0.8 | 0.8 | 1.0 | 1.0 |
| Melting point (Tm) |  | ° C. | 320 | 295 | 310 | 320 | 320 | 320 | 295 |
| Inorganic filler (B) |  | wt % | 25 | 25 | 25 | 25 | 25 | 25 | 25 |
| White pigment (C) |  | wt % | 15 | 15 | 15 | 15 | 15 | 15 | 15 |
| Reflectance |  | — | AA | AA | AA | AA | AA | AA | AA |
| Reflectance retention |  | % | 60 | 60 | 60 | 52 | 40 | 45 | 45 |

*[1]TA (terephthalic acid), AA (adipic acid), HMDA (1,6-diaminohexane)

INDUSTRIAL APPLICABILITY

The polyamide resin composition of the invention can produce moldings having high mechanical strength, excellent heat resistance and a stable high reflectance, and therefore, it can be favorably used for reflectors for LED and reflectors for light emitting devices, such as various electrical and electronic parts, indoor illuminator, ceiling illuminator, outdoor illuminator, automobile illuminator, display equipment and headlight.

The invention claimed is:

1. A reflector obtained by molding a polyamide resin composition for reflectors, wherein the polyamide resin composition comprises 30 to 80% by weight of a polyamide resin (A), 10 to 60% by weight of an inorganic filler (B) and 5 to 50% by weight of a white pigment (C), with the proviso that the total of the components (A), (B) and (C) is 100% by weight, wherein the polyamide resin (A) comprises dicarboxylic acid component units (a-1) comprising 30 to 100% by mol of dicarboxylic acid component units derived from terephthalic acid and 0 to 70% by mol of component units derived from an aromatic dicarboxylic acid other than terephthalic acid and/or 0 to 70% by mol of component units derived from an aliphatic dicarboxylic acid of 4 to 20 carbon atoms, and diamine component units (a-2) comprising component units derived from a straight-chain aliphatic diamine of 6 to 12 carbon atoms and/or component units derived from an aliphatic diamine having a side chain and having 6 to 12 carbon atoms, and the polyamide resin (A) has a terminal amino group concentration of 70 to 230 mmol/kg and an intrinsic viscosity [η] of 0.5 to 0.9 dl/g and a melting point of 270 to 350° C., wherein the reflector has a reflectance retention of not less than 55%.

2. The reflector as claimed in claim 1, which is a reflector for a light emitting diode element.

3. The reflector as claimed in claim 1, wherein the diamine component unit (a-2) contained in the polyamide resin (A) is 1,6-diaminohexane component unit.

4. The reflector as claimed in claim 1, wherein the inorganic filler (B) is a glass fiber.

5. The reflector as claimed in claim 1, wherein the white pigment (C) is titanium oxide.

* * * * *